United States Patent [19]

Barthomeuf et al.

[11] Patent Number: 4,969,786
[45] Date of Patent: Nov. 13, 1990

[54] EXPANSION WALL PLUG FOR DOUBLE MASONRY WALLS

[75] Inventors: Jean-Paul Barthomeuf, Bourg de Peage; Daniel Gallice, Bourg les Valence, both of France

[73] Assignee: Societe de Prospection et D'Inventions Techniques (S.P.I.T), Bourg-les-Valence, France

[21] Appl. No.: 304,305

[22] Filed: Jan. 31, 1989

[30] Foreign Application Priority Data

Feb. 2, 1988 [FR] France .................................. 88 01165

[51] Int. Cl.⁵ ............................................. F16B 13/06
[52] U.S. Cl. ......................................... 411/54; 411/57; 52/565
[58] Field of Search ................. 52/704, 706, 707, 709, 52/378, 379, 513, 565, 714, 426, 462; 411/54, 51, 44, 60, 61

[56] References Cited

U.S. PATENT DOCUMENTS 4,278,006 7/1982 Lobello ............................ 411/57 X Primary Examiner—David A. Scherbel
Assistant Examiner—Creighton Smith
Attorney, Agent, or Firm—Schwartz & Weinrieb

[57] ABSTRACT

An expansion wall-plug is provided having two branches (5,6) of a wire (1) bent upon itself, an expansion stirrup-piece (2), between the branches (5,6), and an expandable socket (3). The rods (5,6) have engagement projections (11,12) against which a washer (4) is in abutment. The rear part of the socket (3) extends beyond the engagement projections (11,12). One of the branches (6) is extended beyond the other by means of a connecting portion (9) having a sealing end (10).

10 Claims, 2 Drawing Sheets

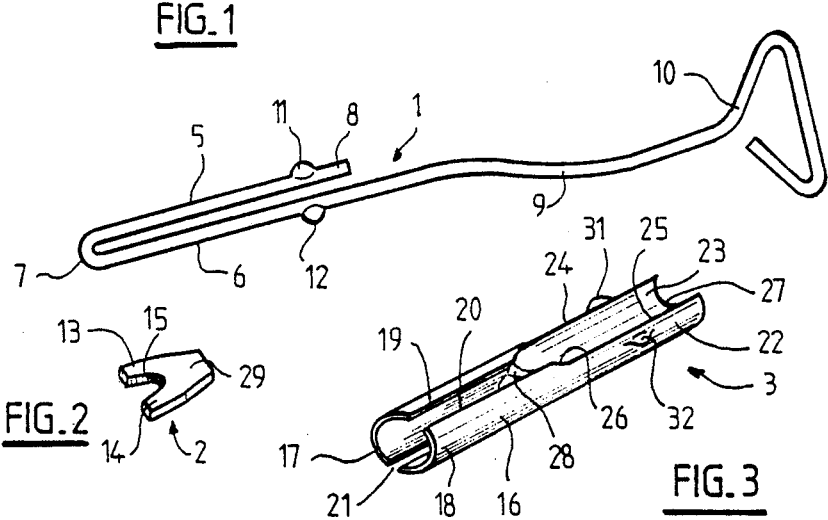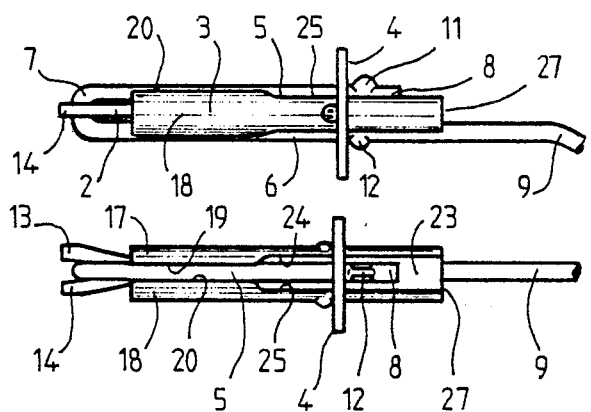

EXPANSION WALL PLUG FOR DOUBLE MASONRY WALLS

FIELD OF THE INVENTION

The present invention relates to an expansion wall-plug intended to be inserted within an anchorage hole, and more particularly to an expansion wall plug comprising an expansion assembly with means for engagement upon the edge of the hole and an expandable socket with passage means for the engagement means and which extends beyond the outer end of the engagement means so as to be expanded by means of the expansion assembly under the action of a striking tool, with the expansion assembly engaged upon the edge of the hole from which the socket projects.

BACKGROUND OF THE INVENTION

In some countries, houses are built with a double masonry wall, namely with an inner support wall, made from bricks or concrete, and an external facing wall, generally made from bricks, the two walls being separated by means of an insulation space. During construction, the ends of metal connecting rods are embedded respectively within both walls so as to secure them one to the other. Subsequently these connecting elements tend to be attacked by means of rust which affects their anchoring quality to such an extent that the external facing wall can potentially collapse. When it is still not too late, the connecting rods must therefore be replaced.

U.S. Pat. No. 4,633,638 teaches, besides the detection of the original tie rod, the removal of the facing bricks associated with these rods, the removal of these rods from the inner wall, boring orifices within the inner wall, within the regions of the original rods, for receiving replacement rods, sealing these orifices with an epoxy resin based mortar and embedding within the orifices thus sealed the undulating ends of new connecting rods, before inserting their other end within a joint defined between two bricks of the facing masonry, that is, an old brick and a new brick.

This method of replacing connecting rods is time-consuming and is particularly expensive.

The present invention provides a connecting element for double wall masonry whose positioning, for example when replacing another element, is simpler than the method of the prior art.

European Patent document EP 0 166 455 teaches an expansion wall-plug intended to be inserted within an anchorage hole, comprising an expansion assembly with means for engagement upon the edge of the hole and an expandable socket with passage means for the engagement means and extending beyond the outer end of the engagement means so as to be expanded by means of the expansion assembly under the action of a striking tool, with the expansion assembly engaged upon the edge of the hole from which the socket projects.

It will be noted that the tool for striking the socket so as to cause expansion thereof may be a very simple and ordinary tool.

It is from patent wall-plug of patent document EP 0 166 455 that the applicant had the idea of solving the problem raised within U.S. Pat. No. 4,633,638. He first sought to modify it, as such, before then adapting it to subsequently contemplated application.

SUMMARY OF THE INVENTION

Thus the present invention relates to an expansion wall-plug of the above-defined type, wherein the expansion assembly comprises an element with two branches of a wire bent upon itself in the form of a hairpin, for guiding the expandable socket which is slotted for this purpose.

The wall-plug of the invention is particularly simple to manufacture.

In the preferred embodiment of the wall-plug of the invention, and for its application to double masonry walls, one of the branches of the expansion element is extended beyond the other by means of a connecting rod portion with a free sealing end.

Advantageously, a flat expansion stirrup-piece having a trapezoidal shape is disposed between the two branches of the wire, and perpendicular to the general plane of the branches so as to abut by means of its bottom against the connection zone of the branches of the expansion element.

Advantageously, in addition, the engagement means comprises two oppositely extending projections formed respectively upon the two branches of the wire at the same distance from their connecting zone and an engagement washer for abutment against the projections.

Preferably, the means defined within the socket for passing the engagement projections formed by external longitudinal slots formed between expansion legs and extended by grooves, opening laterally outwardly, for receiving the guide branches of the expansion wire.

Again preferably, the expandable socket is formed by means of a die-stamped metal sheet having a radial abutment surface for the expansion stirrup-piece.

BRIEF DESCRIPTION OF THE DRAWINGS

The invention will be better understood from the following description of several embodiments of the wall-plug of the invention with reference to the accompanying drawings in which like reference characters designate like or corresponding parts throughout the several views, and wherein:

FIG. 1 is a perspective view of the expansion wire of the wall-plug of the invention;

FIG. 2 is a perspective view of the expansion stirrup-piece of the wall-plug of the invention;

FIG. 3 is a perspective view of a first embodiment of the expandable socket of the wall-plug of the invention;

FIG. 4 is a side view of the wall-plug of the invention with the socket of FIG. 3;

FIG. 5 is a plan view of the wall-plug of FIG. 4;

DETAILED DESCRIPTION OF THE INVENTION

Figure 6:
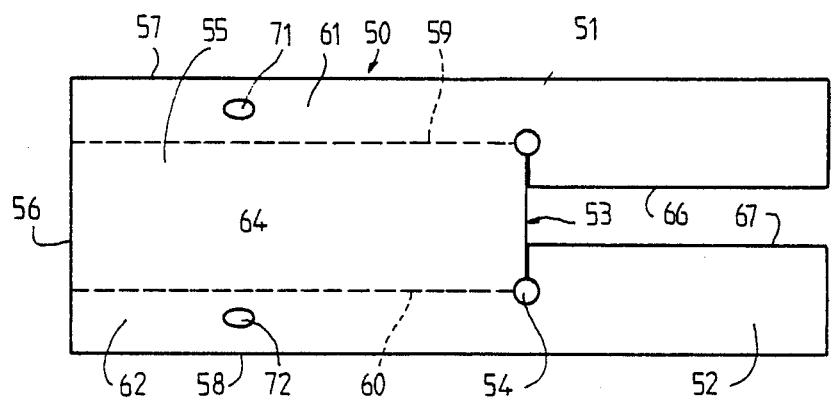
FIG. 6 is a plan view of the starting metal sheet for a second embodiment of the expandable socket of the wall-plug of the invention.

The expansion wall-plug shown in FIGS. 1 to 5 is formed as an expansion assembly, including a metal wire 1 bent on itself and a flat stirrup-piece 2, and an expandable socket 3 and an engagement washer 4. Wire 1, bent into the shape of a very slightly resilient hairpin, has two branches 5, 6 joined together by means of a bent zone 7. Branch 6 is extended, beyond the free end 8 of branch 5 by means of a connecting rod portion 9 ending in a sealing end 10. The end 10 is obtained by bending the end of rod 9 three times so as to form a triangle extending in a plane perpendicular to that of branches 5, 6.

The rod portion 9 is slightly deformed at its median part, with a portion inclined in the general direction of the wire so as to slightly offset the two ends 7, 10 with respect to each other.

Branches 5, 6 on the one hand and the sealing end 10 on the other could just as well extend in two respectively parallel planes.

Branches 5, 6 have two outwardly extending projections 11, 12, located at the same distance from the connection zone 7, and extending in opposite directions with respect to each other, projection 11 being situated slightly short of the end 8 of branch 5. Projections 11, 12 have been formed by pinching the material forming the wire. Projections 11, 12 are means for engaging the wall-plug against the edge of an anchorage hole: they complete their function by cooperating with engagement washer 4, itself intended, after being slipped onto the bent wire at its end 7, to engage the projections.

The stirrup-piece is provided with two branches 13, 14, slightly divergent from its central bottom 15, giving it a general trapeozidal shape.

The expandable socket 3, having a generally cylindrical shape, has a front portion 16 and a rear portion 22. The front portion 16, having the form of a tubular sleeve slit along a diametrical plane, comprises two semi-cylindrical shells, or expansion legs 17, 18, whose respective facing edges 19, 20 form an external longitudinal slit 21 having a width substantially equal to the diameter of the wire, except within zone 7 where, because of the bend and of the slight extrusion, its diameter is very slightly greater. The circular opening formed by means of the free ends of legs 17, 18 has a diameter slightly larger than the width of the small rear base 29 of the stirrup-piece 2. The rear portion 22, substantially longer than the front portion, has two diametrically opposed grooves 23 disposed within a plane perpendicular to the plane of the apertures 21. Grooves 23 are formed with a circular section having a diameter substantially greater than that of wire 1, so that the two edges 24, 25 of each groove 23 are spaced further apart than those 19, 20 of openings 21. This results in recesses 26 being formed within the junction zone of the two portions 16, 22 of the socket. Grooves 23 give to the rear portion 22 of the socket a section in the form of the letter I with curved contours, defined between the rear end 27 and the abutment surface 28 extending in the transverse plane of the recesses 26.

Except for the recesses 26, the edges 19, 20 of the longitudinal slots formed between the expansion legs 17, 18 and the edges 24, 25 of grooves 23 are respectively an extension of each other.

Having described the structural components of the wall-plug, the method of fitting, mounting, an using the same will now be described.

The stirrup-piece 2 is inserted between the branches 5, 6 of wire 1 and it is slid towards the curved connecting portion 7 until its bottom 15 abuts against this portion 7, the planes of stirrup-piece 2 and branches 5,6 then being perpendicular, the stirrup-piece 2 being astride the curved portion 7.

Branch 6 and the adjacent part of the rod portion 9 are inserted through one of the slots or slits 21 within socket 3 and into groove 23 which extends slot 21, and the socket 3 is slid towards zone 7 of the wire. Branch 5 of the wire progressively penetrates, through the other slot 21, into the associated groove 23. Guided by means of branches 5,6, received within the two grooves 23, and with the slots 21 and the laterally outwardly open grooves 23 allowing projections 11, 12 to pass therealong, socket 3 is moved until its legs 17,18 cover the rear part of the stirrup-piece 2 and the free edges of legs 17,18 abut against the side edges of branches 13,14. As a result; the rear end 27 of socket 3 is situated beyond projections 11, 12 and even beyond the end 8 of branch 5. Branches 5, 6, in this position, project laterally and very slightly from slots 21 and grooves 23 of socket 3, the assembly having a section comparable to that of the inner opening of the engagement washer 4. Then the engagement washer 4 is fitted over the free ends of the branches 13,14 of stirrup-piece 2, and about the branches 5,6 of wire 1 and legs 17,18 of the socket until it abuts against projections 11,12. The wall-plug is then ready to be used.

Having bored a hole within the receiving material, in this case that of a supporting masonry wall, the stirrup piece—wire—socket assembly is inserted into the hole until washer 4, in abutment against projections 11,12 bears against the edge of the hole, the rear end 27 of socket 3 projecting out of the hole. Using an ordinary tool, such as, for example, a hammer, socket 3 is struck. Accordingly, socket 3 is forced to slidably move relative to branches 5,6, which are immobilized by means of engagement washer 4 and projections 11, 12 engaged against the masonry wall and the inner end of socket 3 slides over stirrup-piece 2 whose divergent branches 13,14 force apart legs 17,18 of socket 3 which is thus anchored within the hole of the wall. If the connecting rod 9 is subjected to an outwardly directed pull, the rear part 29 of the stirrup-piece 2 abuts against the transverse surface 28 of socket 3 and this tractive force is then exerted over the entire anchored part of the wall-plug which is advantageously transformed into a frictional force upon the wall of the anchorage hole. Because of the slight extrusion within zone 7 of wire 1, socket 3 is perfectly guided during the last part of its free travel, just before it begins to expand.

It then only remains to seal the end 10 of the connecting portion 9 within the facing masonry, between two bricks, within the joint defined therebetween. It is because the plane of this joint and that of the anchorage hole are not generally at the same level that the connecting rod portion 9 is provided with its deformed structure. In an alternative manner either this rod portion will have to be redeformed so as to straighten it or an undeformed expansion wire simply bent upon itself will be used.

Although mention has been made above of an expansion assembly comprising the wire and the stirruppiece, it is because functionally these two elements of the wall-plug are integral with each other and they could perfectly well be formed as a single piece. Similarly, only one of the branches of the wire could be provided with an engagement projection, although this solution is less advantageous than the one described above.

In another embodiment of the expandable socket of the wall-plug of the invention, a metal sheet 50 having a rectangular shape is initially provided. A small rectangular portion is stamped out from the median part of one of the small sides of the rectangle 50, so as to form two identical rectangular lateral tongues 51, 52, substantially shorter than half the length of the large side of rectangle 50. The inner cutting line 53, disposed parallel to the small side of rectangle 50, and interposed between the two tongues 51, 52, is extended slightly inwardly with respect to the tongues, at both ends thereof, at the ends of which cutting line 53 two holes 54 are bored so as to facilitate, not only the extensions of cutting line 53 but also the shaping of the metal sheet thus stamped, as will be described below.

The stamped metal sheet also has a rectangular portion 55, defined partially by the small side 56 of the original rectangle 50, which side was not affected by means of the formation of the tongues 51 and 52 and the extended cutting line 53. Upon an appropriate die, the stamped metal sheet is shaped so that the tongues 51, 52 and the side strips 61, 62 of portion 55 included between the large sides 57, 58 of portion 55 and the straight lines 59, 60, shown with broken lines in FIG. 6, parallel to these sides and passing through holes 54, envelop a right cylinder of circular section with axis 63, the central part 64 of portion 55 situated between strips 61 and 62 being pushed back from the envelope zone of the cylinder towards this axis 63 so that axis 63 extends axially through the median part of this portion 64. The section of portion 55, after die-stamping, has a form close to that of the small Greek letter ω, a rounded sector however being substituted at the central bending-back point.

Figure 7:
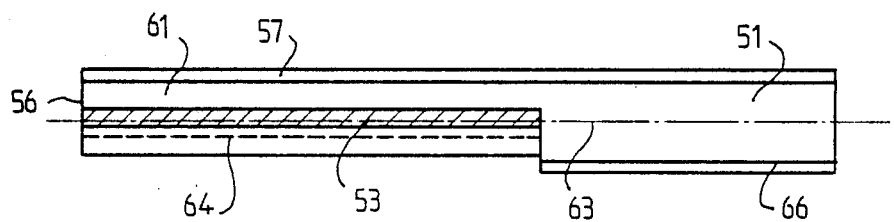
FIG. 7 is an axial section of the second embodiment of the expandable socket shown in FIG. 6.
Figure 8:
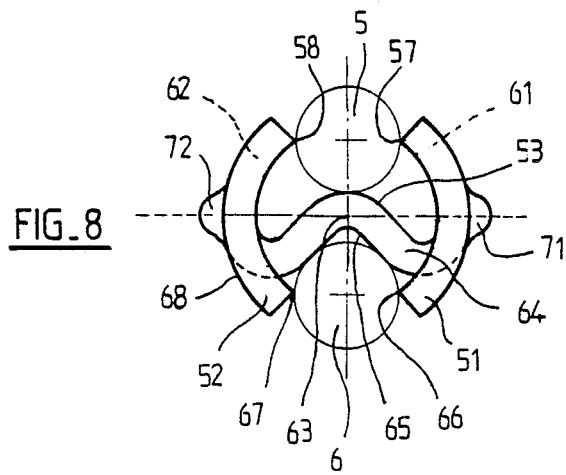
FIG. 8 is an end view, on a larger scale, of the socket of FIGS. 6 and 7.

Functionally, the socket of FIGS. 6–8 and that of FIG. 3 are the same. Tongues 51, 52 thus formed correspond to the expansion legs 17, 18. The space between strips 61, 62 and the median part 64, on the one hand, and the groove 65 under the space, that is, under the rounded sector of portion 64, correspond to grooves 23. The cross sectional plane 53 of portion 64 corresponds to the abutment surface 28. The opening between the two edges 57, 58 within the zone of legs 51, 52 and the opening between the opposite edges 66, 67 of these legs correspond to slots 21. The plane containing side 56 corresponds to the end 27. Consequently, and for assembling the wall-plug with the socket of FIGS. 6–8, branch 6 of the wire is inserted between legs 51, 52 and into groove 65 and the socket is slid towards zone 7 of the wire. Branch 5 penetrates gradually into the groove formed between edges 57, 58 and portion 64. Guided by means of the branches 5, 6, received within the two grooves, the slots defined between edges 57, 58 and 66, 67 allow projections 11, 12 to pass therethrough, the socket is moved until its legs 51, 52 cover the rear portion of the stirrup-piece 2 and until the free edges of legs 51, 52 come into abutment against the edges of stirrup-piece 2, and the rear end adjacent side 56 of the socket is situated beyond projections 11, 12. In the case of the socket shown in FIGS. 6–8, branches 5, 6, while remaining within the volume defined by means of the external envelope 68 of the socket, project laterally and very slightly from the openings, that is, they project outside the planes of the edges of these openings. Anchorage of the wall-plug with the socket shown in FIGS. 6–8 takes place as described above.

It will be noted that the shape of the socket of FIGS. 6–8 is preferred to that of FIG. 3, for reasons of facility and cost of manufacture.

In order to immobilize the components of the wall-plug before expansion, upon the rear portion 22 of socket 3 of FIG. 3, two projections or bosses 31, 32 will be formed, diametrically opposite and substantially in a plane orthogonal to that of legs 5, 6 and accommodating were portions 5, 6. Similarly, on the strips 61, 62 of the metal sheet of the socket 50 of FIGS. 6–8, similar projections 71, 72 will be formed extending, after die-stamping substantially in the diametrical plane orthogonal to that of the openings, between the edges 57, 58 and 66, 67.

The wall-plug is fitted in the same manner as that of the embodiment of FIGS. 1–5 including the fact except that the engagement washer 4 is forced over the sockets. Once the wall-plug is assembled, the washer is in abutment upon one side against the projections of the wire and upon the other side against those of the socket, so that these three parts are immobilized with respect to each other.

Obviously, many modifications and variations of the present invention are possible in light of the above teachings. It is therefore to be understood that within the scope of the appended claims, the present invention may be practiced otherwise than as specifically described herein.

We claim:

1. An expansion wall plug assembly, comprising:
   expandable socket means having a first expandable end thereof for disposition with an anchorage hole while said socket means is in a non-expanded state and for engaging interior sidewall portions of said anchorage hole when said expandable socket means attains an expanded state, and a second end thereof which is disposed externally of said anchorage hole;
   expansion means having means disposed upon an outer end thereof for engaging an edge portion of said anchorage hole so as to retain said expansion means at a relatively fixed position with respect to said anchorage hole when an inwardly directed force is applied to said second end of said socket means for moving said socket means axially inwardly within said anchorage hole, and an expansion member disposed upon an inner end thereof disposed within said anchorage hole for engaging said first expandable end of said socket means, when said socket means is moved axially inwardly within said anchorage hole under the influence of said inwardly directed force applied to said second outer end of said socket means, so as to expand said expandable end of said socket means into engagement with said interior sidewall portions of said anchorage hole;
   said expansion means including a substantially U-shaped wire portion comprising two leg members and a U-bend section, interconnecting said two leg members together, for retaining said expansion member in engagement with said expandable end of said socket means; and
   said expandable socket means including axially extending slot means for axially accommodating said two leg members of said expansion means and for permitting said axially inward movement of said socket means within said anchorage hole relative to said expansion means under the influence of said inwardly directed force.

2. Wall-plug according to claim 1, wherein the expansion means includes a flat expansion stirrup-piece (2), of trapezoidal shape, disposed between the two leg members (5,6) of the wire, perpendicularly to the general plane of said leg members (5,6), a bottom portion (15) being in abutment against a connection zone (7) of side said leg member (5,6) of the expansion means wire portion.

3. Wall-plug according to claim 1, wherein the engaging means include two opposite projections (11,12) formed respectively on the two leg members (5,6) of the wire, at the same distance from a connection zone (7) thereof.

4. Wall-plug according to claim 3, wherein said engaging means comprises an engagement washer (4) in abutment against the engagement projections (11,12).

5. Wall-plug according to claim 1, wherein said slot means of the socket (3;50) for axially accommodating said two leg members of said expansion means and for permitting relative movement of said two leg members of said expansion means therewithin during said axially inward movement of said socket means include external longitudinal openings (21;57,58-66,67) formed between expansion legs (17,18;51,52) and extended by grooves (23;65-61,62,64), open laterally outwardly, for receiving the leg members (5,6) of the expansion means.

6. Wall-plug according to claim 2 wherein the socket (3;50) has a transverse surface (28;53) for abutment of the stirrup-piece (2).

7. Wall-plug according to claim 1, wherein the socket (50) is formed from a die-stamped metal sheet (50).

8. Wall-plug according to claim 1, wherein said socket means comprises a starting metal sheet (50), with a rectangular part (55) extended by two stamped legs (51,52), which is enveloped about a right cylinder of circular section, a central part (64) of the rectangular part (55) being pushed back towards an axis (63) of the cylinder.

9. Wall-plug according to claim 1, wherein one (6) of the leg members of the expansion means wire portion is extended beyond the other leg member (5) by a connection type portion (9) having a free sealing end (10).

10. Wall-plug according to claim 3, wherein the socket (3;50) has securing projections (31,32;71,72), a washer (4) being in abutment on one side against the engagement projections (11,12) and on the other against the securing projections (31,32;71,72).

* * * * *